April 28, 1942.  J. N. SALER  2,281,080

LIQUID CONGEALING APPARATUS

Filed May 16, 1939

WITNESSES:
W. M. Van Scive
Andrew J. Cook

INVENTOR
JULES N. SALER.
BY
ATTORNEY

Patented Apr. 28, 1942

2,281,080

UNITED STATES PATENT OFFICE 2,281,080

LIQUID CONGEALING APPARATUS

Jules N. Saler, Springfield, Mass., assignor to Westinghouse Electric & Manufacturing Company, East Pittsburgh, Pa., a corporation of Pennsylvania Application May 16, 1939, Serial No. 273,848

10 Claims. (Cl. 62—108.5)

My invention relates to liquid congealing apparatus, and particularly to liquid congealing apparatus for domestic refrigerators wherein the ice is removed by mechanical force as contrasted with the use of heat.

Heretofore, most mechanical ice tray grids have had one of two drawbacks; either all the ice cubes are broken loose upon operation of the grid, making it impractical to replace the unused cubes in the tray, or a separate lever or handle has been used, which is awkward to use and may be lost or mislaid.

It is, therefore, an object of my invention to provide liquid congealing apparatus for forming individual ice cubes in which a small number of ice cubes may be harvested without disturbing the remaining ice cubes and in which the leverage or ice cube removing means is attached to the grid to provide a unitary structure.

It is another object of my invention to provide liquid congealing apparatus constructed to perform the above object in which the ice cube removing means also functions to remove the grid with its frozen contents from the pan in which the grid is removably disposed.

These and other objects are effected by my invention as will be apparent from the following description and claims taken in accordance with the accompanying drawing, forming a part of this application, in which:

Figure 1:
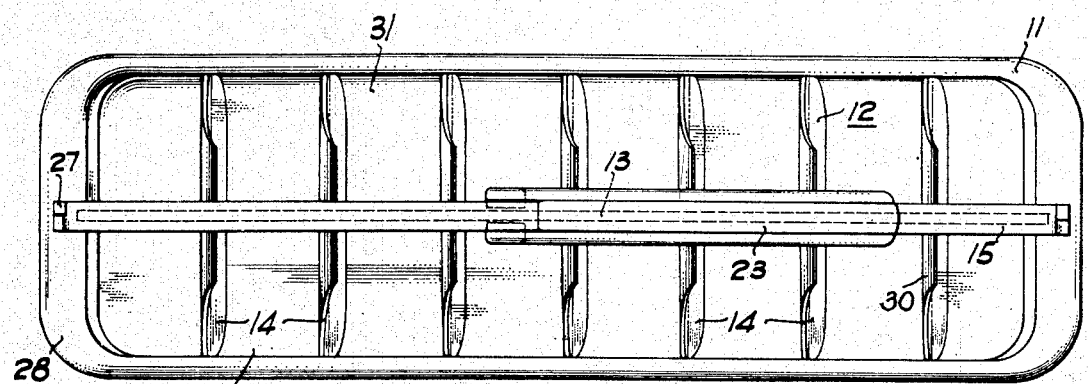
Fig. 1 is a top plan view of an ice pan and removable grid illustrating a preferred form of my invention.

Referring specifically to the drawing for a detailed description of my invention, numeral 11 designates a shallow pan preferably formed of stamped aluminum and numeral 12 designates generally a grid structure also preferably formed from stamped aluminum parts. Both the pan 11 and the grid structure 12 are preferably treated with a wax-like material to facilitate removal of ice cubes therefrom as disclosed in the patent to W. B. Anderson No. 2,135,023.

Figure 3:
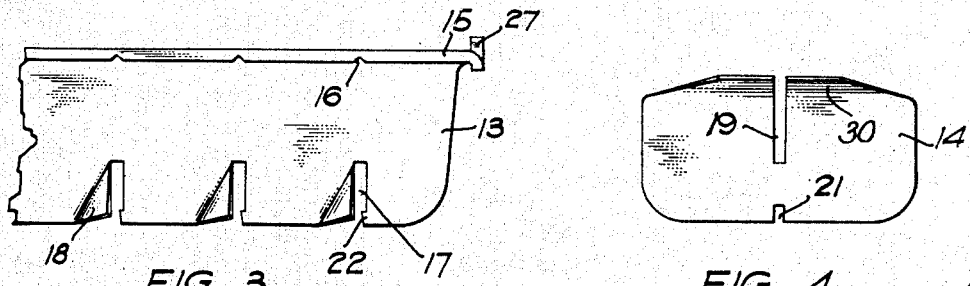
Fig. 3 is a fragmentary view of the longitudinal wall of the grid structure shown in Figs. 1 and 2 before the slots at the bottom thereof are closed to retain the transverse wall members of the grid in position.
Figure 4:
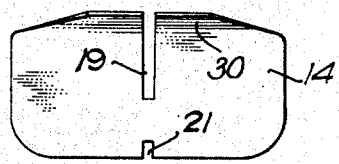
Fig. 4 is a detail of a transverse wall member of the grid.
Figure 5:
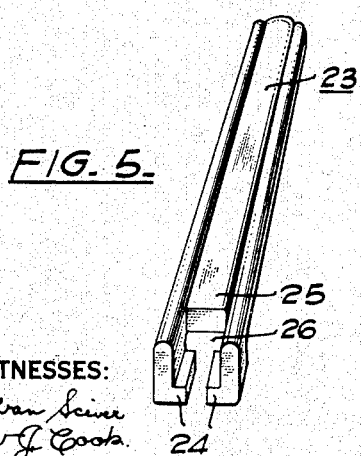
Fig. 5 is a perspective view of the handle provided on the grid structure.

The grid structure 12 embodies an upright longitudinal wall member 13 and a plurality of upright transverse wall members 14. The longitudinal wall member 13 is provided with a slideway 15 at the top thereof having notches 16 cut in its under side for a purpose hereinafter described. A plurality of slots 17 extend upwardly from the bottom of the longitudinal grid member 13 and receive the transverse wall members 14. As shown in Fig. 3, one edge 18 of the slots 17 is bent outwardly before assembly of the transverse wall members 14. After the transverse wall members 14 are assembled on the longitudinal wall member 13, the portions 18 are bent parallel to the remainder of the longitudinal wall member 13 and retain the transverse wall members 14 loosely therein and normally inclined slightly to the vertical.

The transverse wall members 14 have slots 19 extending from the top thereof and slots 21 extending from the bottom thereof. The upper slots 19 receive the upper portion of the longitudinal wall member 13 between the slots 17 and the slideway 15 and the lower slots 21 receive the shoulders 22 formed at the bottom of the slots 17 in the longitudinal wall member 13.

Figure 6:
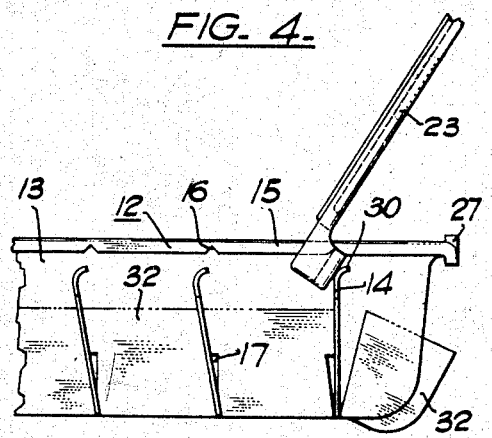
Fig. 6 is a fragmentary view of the grid structure showing the handle engaging one of the transverse wall members to remove some of the ice cubes from the grid structure.

A handle or leverage device, generally indicated at 23, slides longitudinally on the slideway 15. The handle 23 is provided with a pair of inturned lower lugs 24 and an upper central body portion 25 between which is formed an opening 26 which receives the slideway 15. The central body portion 25 of the handle 23 does not extend over the inturned lugs 24 so that the handle 23 is capable of being moved lengthwise on the slideway 15 or angularly thereto as shown in Fig. 6. The inner and upper corners of the inturned lugs 25 engage the slideway 23 and preferably the notches 16 therein, to prevent lengthwise movement of the handle 23 when it is rotated angularly. After the handle 23 is assembled on the slideway 15, the ends of the slideway are bent as shown at 27 to prevent the handle 23 from being removed from the slideway 15. It will be noted that the slideway 15 extends above a lip 28 of the ice pan 11.

Figure 2:
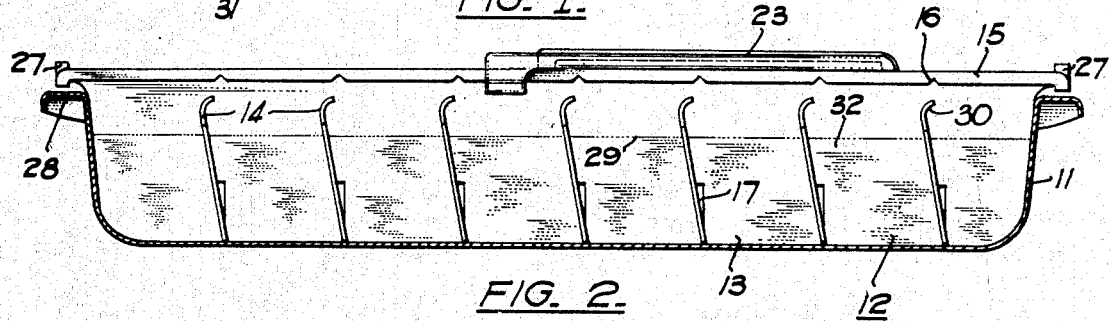
Fig. 2 is a longitudinal sectional view of the ice pan and removable grid structure.

In operation, the ice pan is filled with water approximately to the level 29 shown in Fig. 2 and the removable grid 12 is placed in the ice pan 11 to form two rows of cells 31 which form ice cubes 32 when the water is frozen. After the water is frozen, the handle 23 is moved longitudinally along the slideway 15 to the left-hand extremity thereof and the handle 23 is then moved angularly and engages the lip 28 of the ice pan 11 to lift the grid 12 and the frozen ice cubes 32 from the ice pan 11. The grid 12 is then preferably removed and the handle 23 is slid lengthwise to the right-hand extremity of the grid until it engages the first notch 16. The handle 23 is then again rotated angularly as shown in Fig. 6 until the bottom of the lugs 24 engages a rounded portion 30 at the top of the transverse grid walls 14. Further movement of the handle member 23 rotates the transverse wall members 14 angularly and breaks the first set of ice cubes 32 from the grid structure 12, the movement of the transverse wall members 14 being limited by the slots 17. The handle member 23 is then moved to the left until it engages the next notch 16 and the operation is repeated; and so on until the required number of ice cubes are removed by two's from the grid 12. If it is only desired to remove a small number of ice cubes from the grid structure, it is obvious that this may be accomplished without disturbing the remaining ice cubes and thereafter the grid 12 may be replaced in the pan 11 and, if desired, the cells 31 which have had the ice cubes removed therefrom may be refilled with water for freezing.

From the foregoing, it will be apparent that I have provided a grid structure in which the leverage means for removing the grid from the ice pan and for thereafter imparting ice dislodging movement to the ice cubes is attached to the grid structure and wherein pairs of ice cubes may be removed from the grid structure without disturbing the remaining ice cubes thereon. It will also be apparent that the grid structure which I have provided is capable of being formed of relatively inexpensive stamped aluminum parts and is readily assembled.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In liquid congealing apparatus, the combination of an ice pan, a removable grid disposed therein for dividing the pan into a plurality of cells for forming separate pieces of ice, said grid embodying members movable relative to and independently of each other, a slide extending longitudinally of said grid and leverage means arranged to move longitudinally of the grid on said slide into cooperative relation with only one of said movable members at a time and being thereafter angularly movable while still attached to said slide to impart ice dislodging movement to that movable member without disturbing the remaining members.

2. The combination set forth in claim 1 wherein the leverage means is also engageable with said pan to remove the grid with said pieces of ice frozen therein from the pan.

3. In liquid congealing apparatus, the combination of an ice pan, a removable grid therein for dividing the ice pan into a plurality of cells for forming separate pieces of ice, said grid embodying a longitudinal partition means and a plurality of transverse partition walls extending outwardly from both sides of said longitudinal partition means and being mounted for independent angular movement with respect to said longitudinal partition means, a slideway formed at the top of the longitudinal partition means, and leverage means arranged to move longitudinally on said slideway and then angularly with respect to said slideway to impart ice dislodging movement to pieces of ice between adjacent transverse walls on both sides of said longitudinal partition means without disturbing the remainder of the ice in the grid.

4. The combination claimed in claim 3 wherein the leverage means when moved angularly engages only one of said transverse walls to move it relative to said longitudinal partition means.

5. In liquid congealing apparatus, the combination of an ice pan, a removable grid disposed therein dividing the pan into a plurality of cells for forming separate pieces of ice, said grid embodying a plurality of transverse partitions spaced longitudinally of the pan, and means attached to and movable first longitudinally of the grid and then angularly thereto to dislodge the pieces of ice from between adjacent transverse partitions without disturbing the remaining pieces of ice therein, said means also being adapted to remove the grid with the ice therein from the pan.

6. In liquid congealing apparatus, the combination of an ice pan, a removable grid therein for dividing the ice pan into a plurality of cells for forming separate pieces of ice, said grid embodying a longitudinal partition means and a plurality of transverse partition walls extending outwardly from both sides of said longitudinal partition means, said transverse partition walls being angularly movable with respect to and independently of each other, handle means attached to the grid and arranged to move longitudinally thereof and to rotate angularly thereto to impart ice dislodging movement to pieces of ice between adjacent transverse partition walls on both sides of said longitudinal partition means without disturbing the remainder of the ice in the grid, and means disposed longitudinally of the grid for slidably engaging said handle means and for affording said rotational movement of the handle means with respect to said grid.

7. In an ice cube-forming device, the combination of an ice pan, a removable grid disposed therein for forming separate ice cubes, said grid embodying members movable relative to and independently of each other, and means attached to the ice cube-forming device in slidable interlocking relationship therewith and adapted to be moved and remain in engagement with only one of said movable members at a time, said means being thereafter further movable to impart ice dislodging movement to that movable member without disturbing the remaining members.

8. In an ice cube-forming device, the combination of an ice pan, a removable grid disposed therein for forming separate ice cubes, said grid embodying members movable relative to and independently of each other, and means attached to the ice cube-forming device in slidable interlocking relationship therewith and adapted to be moved and remain in engagement with only one of said movable members at a time, said means being thereafter angularly movable to impart ice dislodging movement to that movable member without disturbing the remaining members.

9. In an ice cube-forming device, the combination of an ice pan, a removable grid disposed therein dividing the pan into a plurality of cells for forming separate ice cubes, said grid embodying a plurality of transverse partitions spaced longitudinally of the pan, and means attached to the ice cube-forming device in slidable interlocking relationship therewith, said means being moved first longitudinally of the grid and then angularly thereto to dislodge the ice cubes from between adjacent transverse partitions without disturbing the remaining ice cubes in the grid.

10. In an ice cube-forming device, the combination of an ice pan, a removable grid therein for dividing the ice pan into a plurality of cells for forming separate ice cubes, said grid member embodying a longitudinal partition wall and a plurality of transverse partition walls extending outwardly from both sides of said longitudinal partition wall, said transverse partition walls being movable with respect to and independently of each other, and leverage means attached to the ice cube-forming device in slidable interlocking relationship therewith and arranged to move longitudinally thereof and to rotate angularly to impart ice dislodging movement to ice cubes between adjacent transverse partition walls on both sides of said longitudinal partition wall without disturbing the remainder of the ice cubes in the grid.

JULES N. SALER.